(12) United States Patent
Xu (10) Patent No.: US 12,348,140 B2
(45) Date of Patent: Jul. 1, 2025

(54) WIDE RANGE AMPLIFIER AND CONTROL METHOD

(71) Applicant: LEN TECH Inc., Plano, TX (US)

(72) Inventor: Gonggui Xu, Plano, TX (US)

(73) Assignee: LEN TECH Inc., Plano, TX (US)

( * ) Notice: Subject to any disclaimer, the term of this patent is extended or adjusted under 35 U.S.C. 154(b) by 256 days.

(21) Appl. No.: 18/211,375

(22) Filed: Jun. 19, 2023

(65) Prior Publication Data

US 2024/0421707 A1    Dec. 19, 2024

(51) Int. Cl.
*H02M 3/158*    (2006.01)

(52) U.S. Cl.
CPC .................................. *H02M 3/158* (2013.01)

(58) Field of Classification Search
CPC ................................ H02M 3/158; H02M 1/36
See application file for complete search history.

(56) References Cited

U.S. PATENT DOCUMENTS

| 9,407,145 | B1* | 8/2016 | Burstein | H03H 7/20 |
| 9,811,101 | B2* | 11/2017 | Zhang | H02M 3/158 |
| 2023/0299674 | A1* | 9/2023 | Liu | H02M 3/06 |
| | | | | 323/271 |

* cited by examiner

*Primary Examiner* — Adolf D Berhane
*Assistant Examiner* — Afework S Demisse
(74) *Attorney, Agent, or Firm* — AP3 Law Firm PLLC (57) ABSTRACT

An apparatus includes a wide range differential pair configured to operate at a low voltage level through reducing bias currents in a startup process of a power converter, and operate at a high voltage level through configuring detected voltages to bias the wide range differential pair, a reference circuit configured to regulate a current flowing through the power converter through the wide range differential pair, and a low voltage circuit configured to convert differential currents generated by the wide range differential pair into a control voltage for regulating the current flowing through the power converter.

20 Claims, 7 Drawing Sheets

WIDE RANGE AMPLIFIER AND CONTROL METHOD

TECHNICAL FIELD

The present invention relates to a wide range amplifier and control method, and, in particular embodiments, to a wide range error amplifier for achieving constant current control of a power converter.

BACKGROUND

As technologies further advance, a variety of processors such as Digital Signal Processors (DSPs), Field Programmable Gate Arrays (FPGAs), Central Processing Units (CPUs) and/or the like, have become popular. Each processor operates with a low supply voltage (e.g., sub-1V) and consumes a large amount of current. Meanwhile, the input voltage bus has stayed the same (e.g., 12 V) or increased to a higher level (e.g., 48 V) depending on different applications or design needs.

In a high voltage application where a low output voltage is required, two power stages connected in cascaded are traditionally employed to covert the high input voltage into a suitable low voltage fed into the processor. However, this power architecture increases the system cost and complexity.

In order to reduce the system cost and complexity, a load in the high voltage application may be powered by a power converter. The power converter such as a buck converter includes two power switches connected in series. A first power switch not connected to ground is referred to as a high-side switch. A second power switch connected to ground is referred to as low-side switch. A common node of the high-side switch and the low-side switch is a switching node of the power converter. A low-side gate drive circuit and a high-side gate drive circuit are employed to control the gates of the low-side switch and the high-side switch, respectively.

The low-side switch and the high-side switch may be implemented as metal oxide semiconductor field effect transistors (MOSFET). MOSFETs are voltage-controlled devices. When a gate drive voltage is applied to the gate of a MOSFET, and the gate drive voltage is greater than the turn-on threshold of the MOSFET, a conductive channel is established between the drain and the source of the MOSFET. After the conductive channel has been established, the MOSFET is in an on state in which power flows between the drain and the source of the MOSFET. On the other hand, when the gate drive voltage applied to the gate is less than the turn-on threshold of the MOSFET, the MOSFET is turned off accordingly.

According to different control mechanisms, power converters may be categorized into two types, namely constant voltage power converters and constant current power converters. In a constant voltage power converter, the control loop adjusts the duty cycle of the high-side switch so as to maintain a constant output voltage regardless of changes to operating parameters such as the input voltage and/or load current. In a constant current power converter, the control loop adjusts the duty cycle of the high-side switch so as to maintain a constant output current regardless of changes to operating parameters such as the input voltage and/or output resistance.

SUMMARY

These and other problems are generally solved or circumvented, and technical advantages are generally achieved, by preferred embodiments of the present disclosure which provide a wide range error amplifier for achieving constant current control of a power converter.

In accordance with an embodiment, an apparatus comprises a wide range differential pair configured to operate at a low voltage level through reducing bias currents in a startup process of a power converter, and operate at a high voltage level through configuring detected voltages to bias the wide range differential pair, a reference circuit configured to regulate a current flowing through the power converter through the wide range differential pair, and a low voltage circuit configured to convert differential currents generated by the wide range differential pair into a control voltage for regulating the current flowing through the power converter.

In accordance with another embodiment, a method comprises configuring a power converter to operate in a wide range from a first voltage level to a second voltage level, configuring an amplifier to regulate a current flowing through the power converter, the amplifier comprising a wide range differential pair, a reference circuit and a low voltage circuit, configuring the wide range differential pair to be capable of operating at the first voltage level through reducing bias currents in a startup process of the power converter, and configuring the wide range differential pair to be capable of operating at the second voltage level through configuring detected voltages to bias the wide range differential pair.

In accordance with yet another embodiment, a power converter comprises a first power switch and a second power switch connected in series between an input voltage bus and ground, an inductor connected between a common node of the first power switch and the second power switch and a first terminal of a current sense device, a capacitor connected between a second terminal of the current sense device and ground, and a wide range amplifier having a first input connected to the first terminal of the current sense device, a second input connected to the second terminal of the current sense device and a third input configured to receive a reference voltage, wherein the wide range amplifier is configured to operate at a low voltage level through reducing bias currents in a startup process of the power converter, and operate at a high voltage level through configuring voltages on the first terminal and the second terminal of the current sense device to bias the wide range amplifier.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a wide range error amplifier for achieving constant current control of a step-down power converter. The disclosure may also be applied, however, to a variety of power converters. Hereinafter, various embodiments will be explained in detail with reference to the accompanying drawings.

Figure 1:
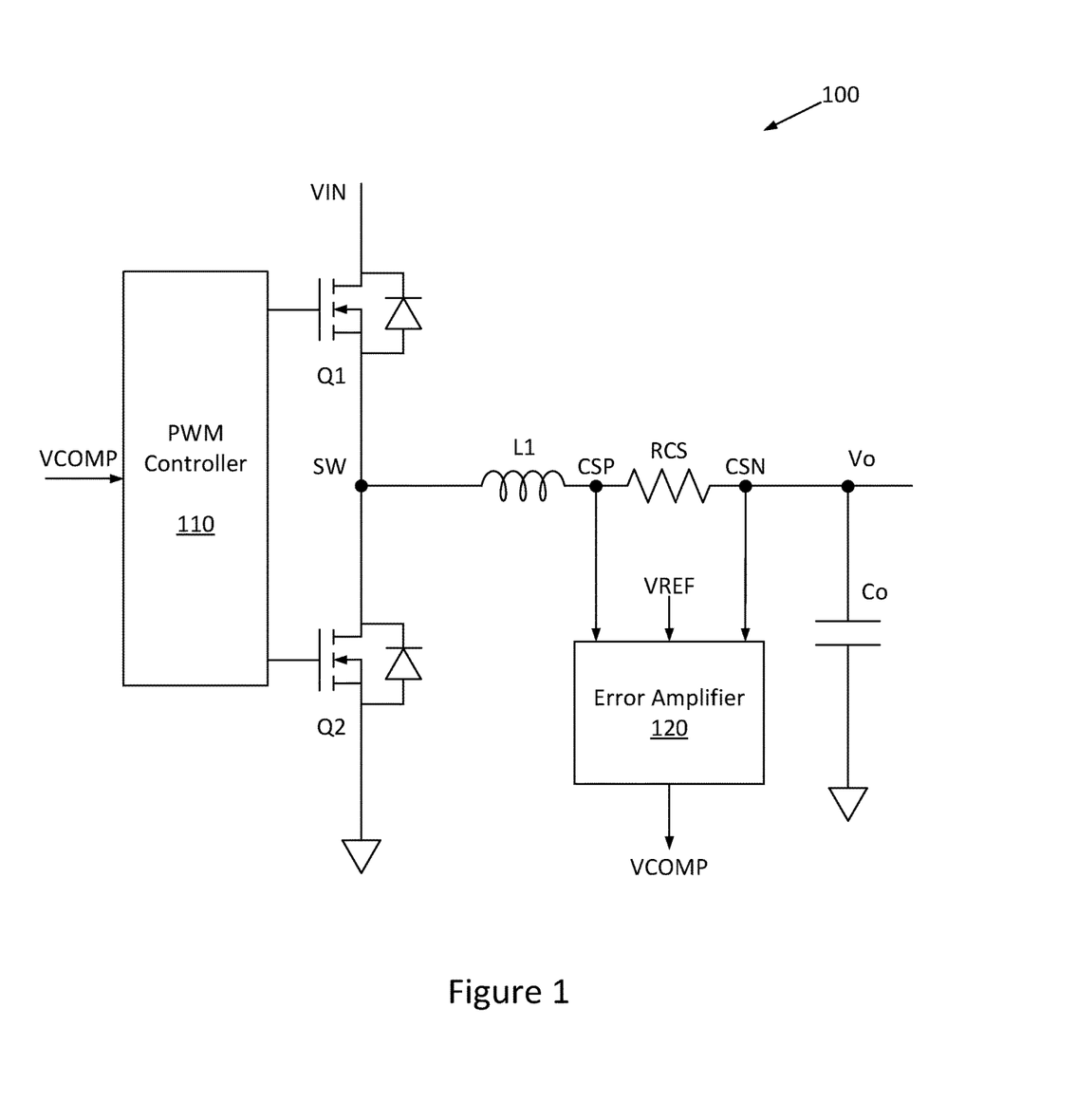
FIG. 1 illustrates a schematic diagram of a power converter and the associated control circuit in accordance with various embodiments of the present disclosure.

FIG. 1 illustrates a schematic diagram of a power converter and the associated control circuit in accordance with various embodiments of the present disclosure. The power converter 100 is a step-down power converter. The power converter 100 is also known as a buck converter. As shown in FIG. 1, the power converter 100 comprises a first power switch Q1, a second power switch Q2, an inductor L1, a current sense device RCS and an output capacitor Co. In some embodiments, the current sense device RCS is implemented as a current sense resistor coupled between the inductor L1 and the output terminal of the power converter 100.

As shown in FIG. 1, the first power switch Q1 and the second power switch Q2 are connected in series between an input voltage bus VIN and ground. The common node of the first power switch Q1 and the second power switch Q2 is a switching node (SW). The inductor L1 is connected between the common node of the first power switch Q1 and the second power switch Q2, and a first terminal of the current sense device RCS. The output capacitor Co is connected between a second terminal of the current sense device RCS and ground.

The control circuit of the power converter 100 comprises a PWM controller 110 and an error amplifier 120. The error amplifier 120 is implemented as a wide range amplifier. Throughout the description, the error amplifier 120 may be alternatively referred to as a wide range amplifier 120.

As shown in FIG. 1, a first input of the wide range amplifier 120 is connected to the first terminal of the current sense device RCS. A second input of the wide range amplifier 120 is connected to the second terminal of the current sense device RCS. Throughout the description, the first terminal of the current sense device RCS is alternatively referred to as a CSP node. The second terminal of the current sense device RCS is alternatively referred to as a CSN node.

A third input of the wide range amplifier 120 is configured to receive a reference voltage VREF. VREF is a predetermined voltage. Based on the received signals, the wide range amplifier 120 is configured to generate a control voltage VCOMP. The control voltage VCOMP is fed into the PWM controller 110. Based on the control voltage VCOMP, the PWM controller 110 is configured to generate gate drive voltages for Q1 and Q2.

In operation, the power converter 100 operates in a wide input voltage range. In some embodiments, the input voltage range is from 0 V to 60 V. The PWM controller 110 is able to generate a gate drive signal having a duty cycle up to 100%. As a result, the output voltage of the power converter 100 is in a range from 0 V to about 60 V.

It should be noted that the upper limit of the input voltage (e.g., 60 V) used in the previous example is selected purely for demonstration purposes and are not intended to limit the various embodiments of the present invention to any particular upper limit.

In operation, the power converter 100 may be configured as a constant output voltage power converter. Alternatively, the power converter 100 may be configured as a constant output current power converter. When the power converter 100 is configured as a constant output voltage power converter, the error amplifier 120 functions as a voltage error amplifier to regulate the output voltage of the power converter 100. In particular, the output voltage of the power converter 100 is proportional to the reference voltage VREF. On the other hand, when the power converter 100 is configured as a constant current voltage power converter, the error amplifier 120 functions as a current error amplifier to regulate the current flowing through of the power converter 100. In particular, the current flowing through the power converter 100 is proportional to the reference voltage VREF.

In operation, the power converter 100 is configured to operate in an input voltage ranging from 0 V to 60 V. In response to this wide input voltage range, the wide range amplifier 120 is configured to operate at a low voltage level (e.g., about 0 V) through reducing bias currents of the wide range amplifier 120 in a startup process of the power converter 100. The wide range amplifier 120 is configured to operate at a high voltage level (e.g., about 60 V) through biasing the wide range amplifier 120 using voltages on the first terminal and the second terminal of the current sense device RCS. The operating principle of the wide range amplifier 120 will be discussed in detail below with respect to FIG. 3.

Figure 2:
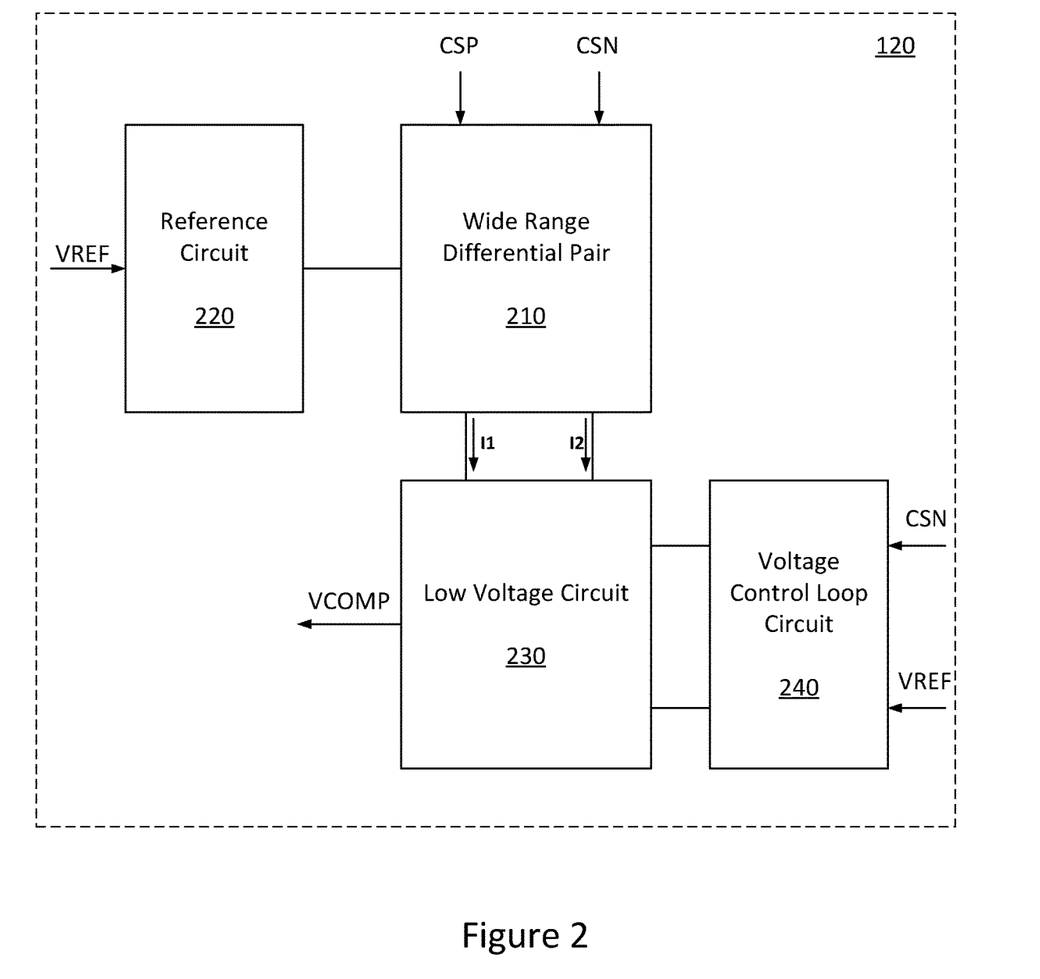
FIG. 2 illustrates a block diagram of the error amplifier shown in FIG. 1 in accordance with various embodiments of the present disclosure.

FIG. 2 illustrates a block diagram of the error amplifier shown in FIG. 1 in accordance with various embodiments of the present disclosure. The error amplifier 120 comprises a wide range differential pair 210, a reference circuit 220, a low voltage circuit 230 and a voltage control loop circuit 240.

As shown in FIG. 2, the reference circuit 220 is configured to receive a predetermined reference voltage VREF. Depending on different operating modes, the predetermined reference voltage is employed to regulate either the current flowing through the power converter 100 or the output voltage of the power converter 100. The output of the reference circuit 220 is fed into the wide range differential pair 210. The wide range differential pair 210 is configured to detect voltages on the CSP and CSN nodes. The wide range differential pair 210 converts the voltage difference across the CSP and CSN nodes into differential currents I1 and I2.

In operation, when the power converter is configured as a constant current power converter, the differential currents I1 and I2 are steered into the low voltage circuit 230 where the differential currents I1 and I2 are converted into the control voltage VCOMP. The control voltage VCOMP is used to generate suitable gate drive signals for Q1 and Q2 so that the current flowing through the inductor L1 of the power converter 100 is proportional to the reference voltage VREF.

In operation, when the power converter is configured as a constant voltage power converter, the auxiliary switches (not shown but illustrated in FIGS. 4-5) in the low voltage circuit 230 are reconfigured such that the low voltage circuit 230 is isolated from the wide range differential pair 210. The voltage control loop circuit 240 is configured to receive the reference voltage VREF. The reference voltage VREF is compared with the output voltage of the power converter 100. The comparison result is converted into the control voltage VCOMP. The control voltage VCOMP is used to generate suitable gate drive signals for Q1 and Q2 so that the output voltage of the power converter 100 is proportional to the reference voltage VREF.

Figure 3:
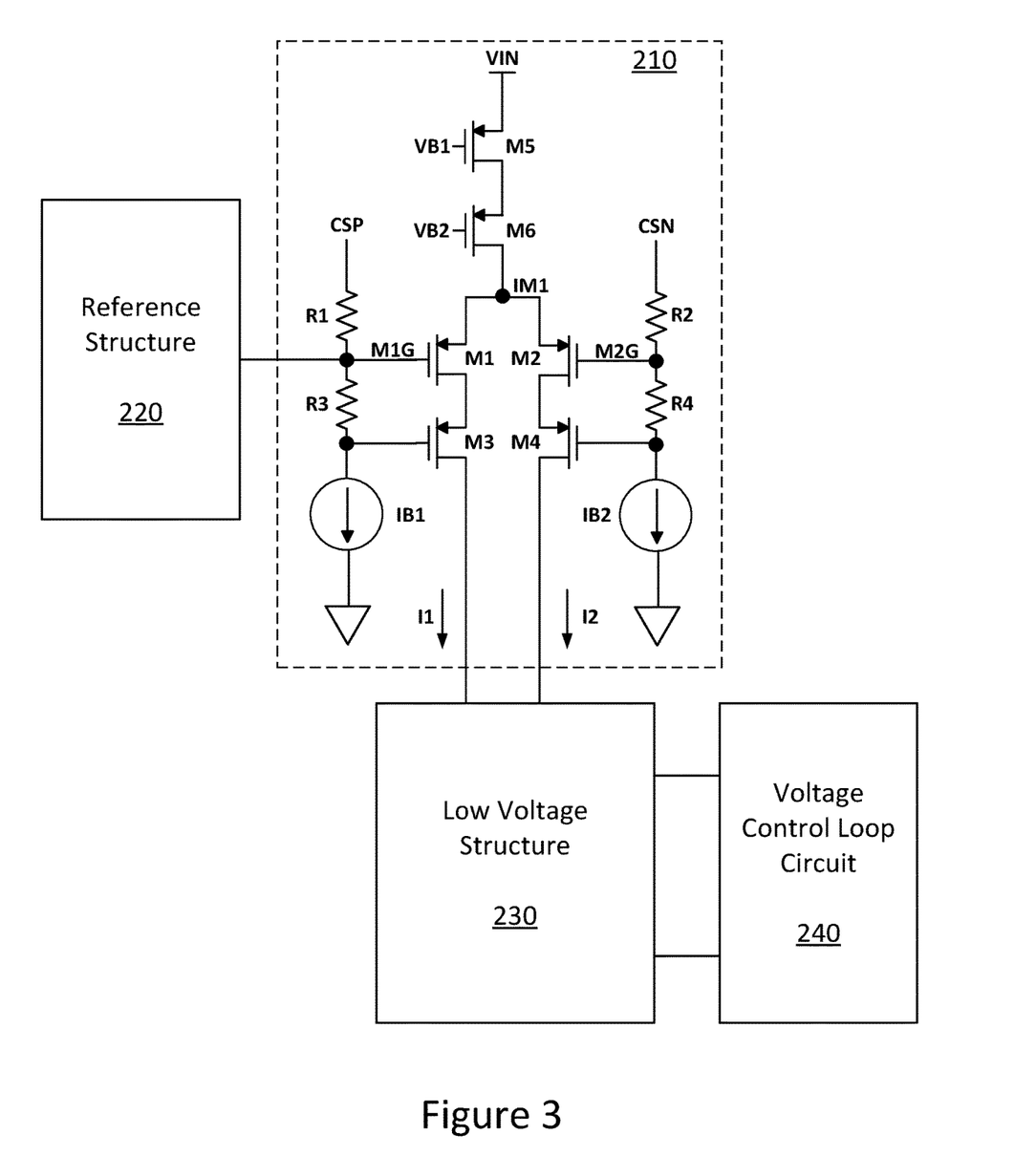
FIG. 3 illustrates a schematic diagram of the wide range differential pair shown in FIG. 2 in accordance with various embodiments of the present disclosure.

FIG. 3 illustrates a schematic diagram of the wide range differential pair shown in FIG. 2 in accordance with various embodiments of the present disclosure. The wide range differential pair 210 comprises a first transistor M1, a second transistor M2, a third transistor M3, a fourth transistor M4, a fifth transistor M5, a sixth transistor M6, a first resistor R1, a second resistor R2, a third resistor R3, a fourth resistor R4, a first current source IB1 and a second current source IB2. In some embodiments, the current provided by the first current source IB1 is equal to the current provided by the second current source IB2.

As shown in FIG. 3, the first transistor M1 and the third transistor M2 are connected in series between a first intermediate node IM1 and a first input of the low voltage circuit 230. The second transistor M2 and the fourth transistor M4 are connected in series between the first intermediate node IM1 and a second input of the low voltage circuit 230.

The fifth transistor M5 and the sixth transistor M6 connected in series between an input voltage VIN of the power converter 100 and the first intermediate node IM1. As shown in FIG. 3, the gate of M5 is connected to a first predetermined bias voltage VB1. The gate of M6 is connected to a second predetermined bias voltage VB2.

The first resistor R1, the third resistor R3 and the first current source IB1 are connected in series between the CSP node and ground. A common node of the first resistor R1 and the third resistor R3 is connected to a gate of the first transistor M1. A common node of the third resistor R3 and the first current source IB1 is connected to a gate of the third transistor M3. Referring back to FIG. 1, the CSP node is a common node of the inductor L1 and the current sense device RCS.

The second resistor R2, the fourth resistor R4 and the second current source IB2 are connected in series between the CSN node and ground. A common node of the second resistor R2 and the fourth resistor R4 is connected to a gate of the second transistor M2. A common node of the fourth resistor R4 and the second current source IB2 is connected to a gate of the fourth transistor M4. Referring back to FIG. 1, the CSN node is a common node of the current sense device RCS and the output capacitor Co of the power converter 100.

In some embodiments, transistors M1, M2 and M5 are low voltage switches. Transistors M3, M4 and M6 are high voltage switches. In some embodiments, the voltage rating of transistors M1, M2 and M5 is about 6 V. The voltage rating of transistors M3, M4 and M6 is about 60 V. The voltage rating of the high voltage switches (e.g., M6) is about ten times greater than that of the low voltage switches (e.g., M5).

In operation, the sixth transistor M6 is employed to provide isolation between the input voltage VIN of the power converter 100 and the CSP and CSN nodes. The third transistor M3 and the fourth transistor M4 are employed to provide isolation between the CSP and CSN nodes and the low voltage circuit 230.

In operation, the wide range differential pair 210 is able to operate in a wide range from a low voltage (e.g., 0 V) to a high voltage (e.g., 60 V). When the power converter 100 operates at a high voltage, the wide range differential pair 210 is dynamically biased by the voltages on the CSP and CSN nodes. The voltage drop (R1×IB1) across R1 provides the range of headroom available for M1. Likewise, the voltage drop (R2×IB2) across R2 provides the range of headroom available for M2.

Similarly, the voltage drop (R3×IB1) across R3 provides the range of headroom available for M3, and voltage drop (R4×IB2) across R4 provides the range of headroom available for M4. When the power converter operates at a low voltage, the operating range of the wide range differential pair 210 can be reduced to the low voltage through reducing the bias currents during a startup process of the power converter. More particularly, during a startup process of the power converter 100, the bias currents (e.g., IB1 and IB2) are reduced to zero when the voltages on the CSP and CSN nodes are approximately equal to zero. Since IB1 and IB2 are equal to zero, the voltage drops across R1, R2, R3 and R4 are equal to zero. As a result, M1, M2, M3 and M4 are able to operate correctly when the power converter operates at the low voltage.

Figure 4:
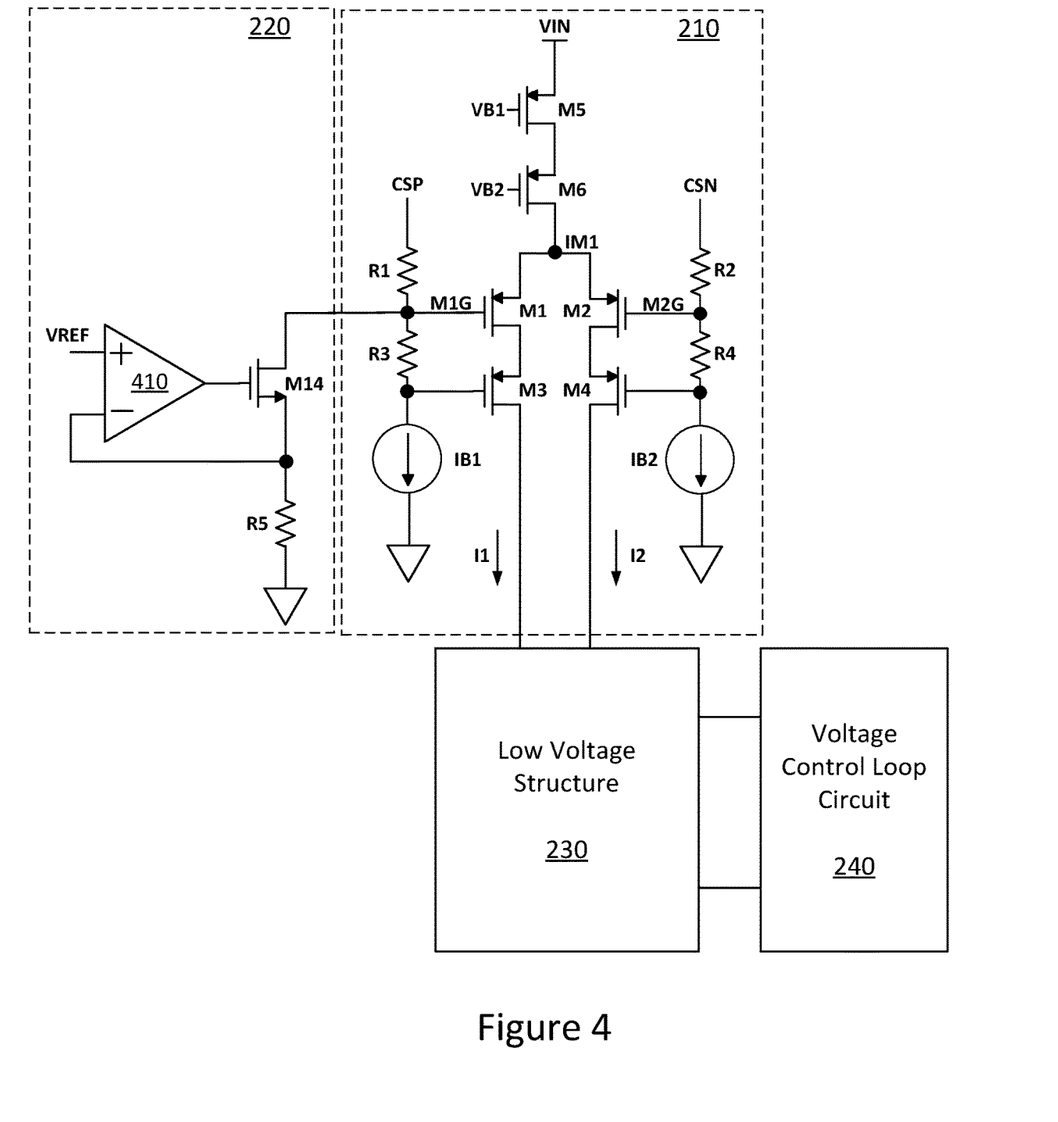
FIG. 4 illustrates a schematic diagram of the reference circuit shown in FIG. 2 in accordance with various embodiments of the present disclosure.

FIG. 4 illustrates a schematic diagram of the reference circuit shown in FIG. 2 in accordance with various embodiments of the present disclosure. The reference circuit 220 comprises an operation amplifier 410, a fourteenth transistor M14 and a fifth resistor R5.

As shown in FIG. 4, a non-inverting input of the operation amplifier 410 is configured to receive the reference voltage VREF. The fourteenth transistor M14 and the fifth resistor R5 are connected in series between a common node of the first resistor R1 and the third resistor R3, and ground. An inverting input of the operation amplifier 410 is connected to a common node of the fourteenth transistor M14 and the fifth resistor R5. A gate of the fourteenth transistor M14 is connected to an output of the operation amplifier 410. The fourteenth transistor M14 functions as a source follower.

According to the operating principle of the differential pair, the voltage at the gate of M1 is equal to the voltage at the gate of M2. As such, the voltage on M1G is equal to voltage on M2G.

The voltage difference between the CSP and CSN nodes can be expressed by the following equation:

$$VCSP - VCSN = VCSP - VM1G + VM2G - VCSN \quad (1)$$

The current flowing through R1 includes the current flowing through the fifth resistor R5 and the current provide by the first current source IB1. The current flowing through R2 is equal to the current provide by the second current source IB2. As such, Equation (1) can be expressed as.

$$VCSP - VCSN = \left(\frac{VREF}{R5} + IB1\right) \times R1 - IB2 \times R2 \quad (2)$$

In some embodiments, IB1 is equal to IB2. R1 is equal to R2. Equation (2) can be simplified as:

$$VCSP - VCSN = \left(\frac{VREF}{R5}\right) \times R1 \quad (3)$$

Equation (3) shows a voltage difference (VCSP–VCSN) of the first input of the amplifier and the second input of the amplifier is proportional to the reference voltage VREF.

Figure 5:
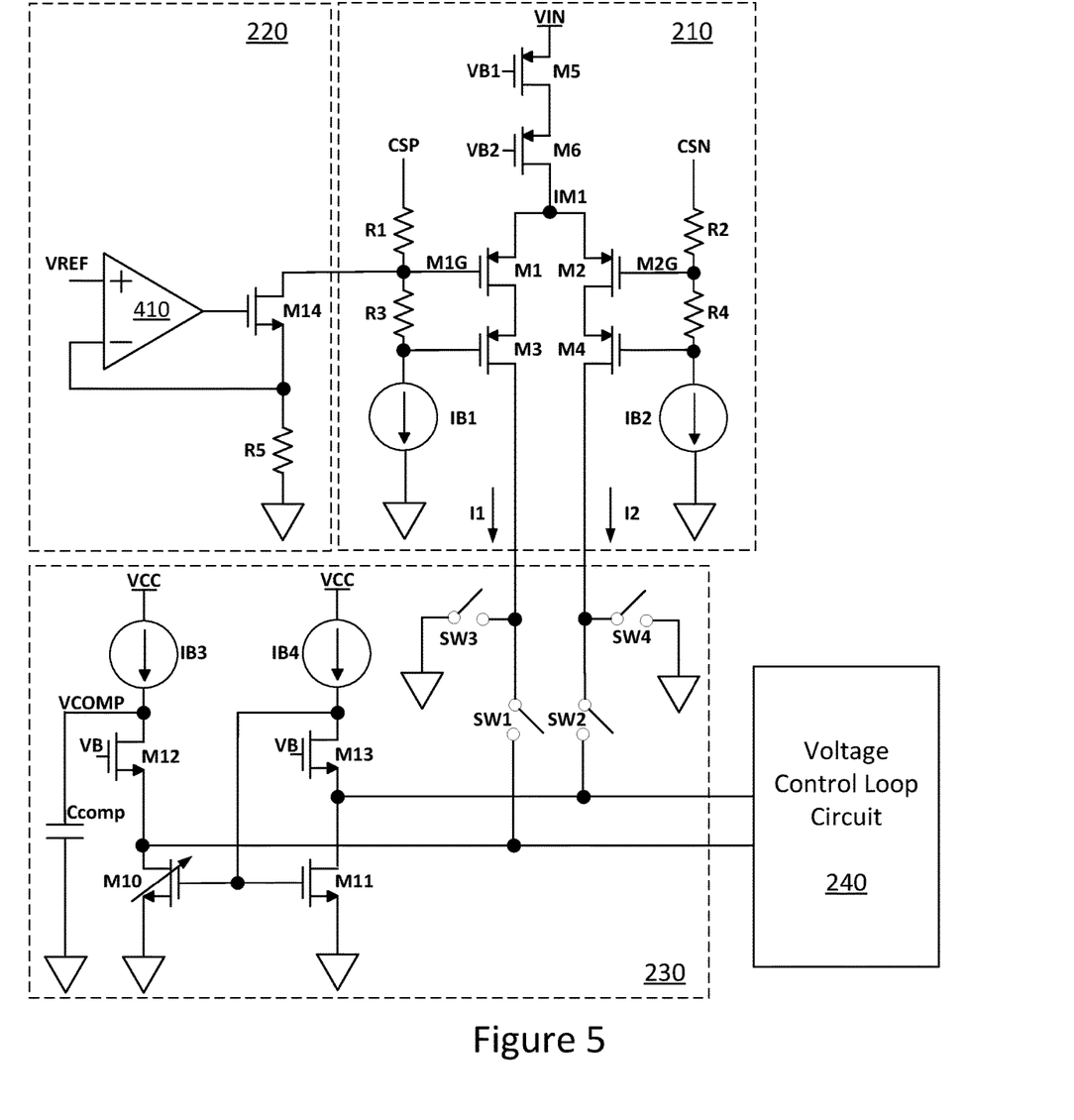
FIG. 5 illustrates a schematic diagram of the low voltage circuit shown in FIG. 2 in accordance with various embodiments of the present disclosure.

FIG. 5 illustrates a schematic diagram of the low voltage circuit shown in FIG. 2 in accordance with various embodiments of the present disclosure. The low voltage circuit 230 comprises a third current source IB3, a fourth current source IB4, a tenth transistor M10, an eleventh transistor M11, a twelfth transistor M12, a thirteenth transistor M13, a first auxiliary switch SW1, a second auxiliary switch SW2, a third auxiliary switch SW3, a fourth auxiliary switch SW4 and a compensation capacitor Ccomp.

As shown in FIG. 5, the third current source IB3, the twelfth transistor M12 and the tenth transistor M10 are connected in series between a bias voltage VCC and ground. The fourth current source IB4, the thirteenth transistor M13 and the eleventh transistor M11 are connected in series between the bias voltage VCC and ground. The gates of the tenth transistor M10 and the eleventh transistor M11 are connected together and further connected to a common node of the fourth current source IB4 and the thirteenth transistor M13. The gates of the twelfth transistor M12 and the thirteenth transistor M13 are connected to a predetermined bias voltage VB. The compensation capacitor Ccomp is connected between a common node of the third current source IB3 and the twelfth transistor M12, and ground.

In some embodiments, transistors M10 and M11 are equal in size. The tenth transistor M10 can be adjusted to trim the offset of the error amplifier 120.

As shown in FIG. 5, the first auxiliary switch SW1 and the third auxiliary switch SW3 are connected in series between a common node of the twelfth transistor M12 and the tenth transistor M10, and ground. A common node of the first auxiliary switch SW1 and the third auxiliary switch SW3 is the first input of the low voltage circuit 230. As shown in FIG. 5, the differential current I1 flows from the wide range differential pair 210 to the low voltage circuit 230 through the first input of the low voltage circuit 230.

As shown in FIG. 5, the second auxiliary switch SW2 and the fourth auxiliary switch SW4 are connected in series between a common node of the thirteenth transistor M13 and the eleventh transistor M11, and ground. A common node of the second auxiliary switch SW2 and the fourth auxiliary switch SW4 is a second input of the low voltage circuit 230. As shown in FIG. 5, the differential current I2 flows from the wide range differential pair 210 to the low voltage circuit 230 through the second input of the low voltage circuit 230.

In operation, when the power converter 100 is configured as a constant current power converter, the first auxiliary switch SW1 and the second auxiliary switch SW2 are turned on, and the third auxiliary switch SW3 and the fourth auxiliary switch SW4 are turned off to steer differential currents I1 and I2 from the wide range differential pair 210 into the low voltage circuit 230. Through the twelfth transistor M12, the tenth transistor M10, the thirteenth transistor M13 and the eleventh transistor M11, the differential currents I1 and I2 are converted into a control voltage VCOMP on the compensation capacitor Ccomp. Referring back to FIG. 1, the control voltage VCOMP is fed into the PWM controller 110. Based on the control voltage VCOMP, the PWM controller 110 generates gate drive signals for Q1 and Q2 to regulate the current flowing through the inductor L1.

Figure 6:
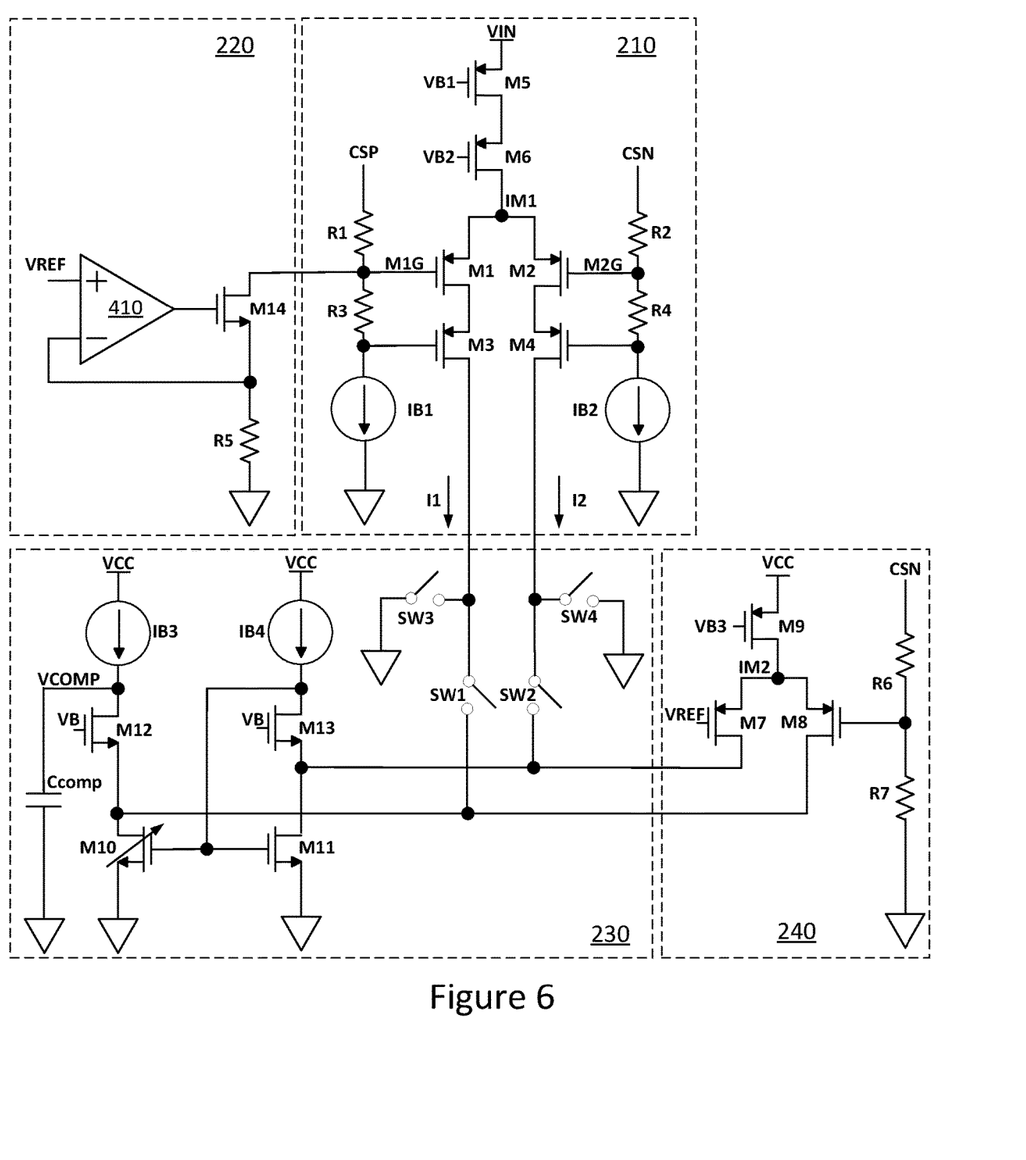
FIG. 6 illustrates a schematic diagram of the voltage control loop circuit shown in FIG. 2 in accordance with various embodiments of the present disclosure.

FIG. 6 illustrates a schematic diagram of the voltage control loop circuit shown in FIG. 2 in accordance with various embodiments of the present disclosure. The voltage control loop circuit 240 comprises a seventh transistor M7, an eighth transistor M8, a ninth transistor M9, a sixth resistor R6 and a seventh resistor R7.

As shown in FIG. 6, the ninth transistor M9 is connected between the bias voltage VCC and a second intermediate node IM2. The seventh transistor M7 is connected between the second intermediate node IM2, and the common node of the thirteenth transistor M13 and the eleventh transistor M11. The eighth transistor M8 is connected between the second intermediate node IM2, and the common node of the twelfth transistor M12 and the tenth transistor M10. The sixth resistor R6 and the seventh resistor R7 are connected in series between the CSN node (the output of the power converter 100) and ground. A gate of the eighth transistor M8 is connected to a common node of the sixth resistor R6 and the seventh resistor R7. A gate of the seventh transistor M7 is configured to receive the reference voltage VREF. A gate of the ninth transistor M9 is connected to a predetermined bias voltage VB3.

In operation, when the power converter 100 is configured as a constant output voltage power converter, the voltage control loop circuit 240 is employed to regulate the output voltage of the power converter 100.

In operation, in order to achieve constant output voltage control, the first auxiliary switch SW1 and the second auxiliary switch SW2 are turned off, and the third auxiliary switch SW3 and the fourth auxiliary switch SW4 are turned on. In response to this auxiliary switch configuration, the operating mode of the power converter is switched from a constant current control mode to a constant voltage control mode.

The error amplifier 120 is configured such that an output voltage of the power converter 100 is proportional to the reference voltage VREF. Referring back to FIG. 1, the voltage on the CSN node is the output voltage of the power converter 100. The voltage on the CSN node can be expressed by the following equation:

$$VCSN = \left(\frac{R6 + R7}{R7}\right) \times VREF \quad (4)$$

Equation (4) indicates under the constant output voltage control, the output voltage of the power converter 100 is proportional to the reference voltage VREF.

Figure 7:
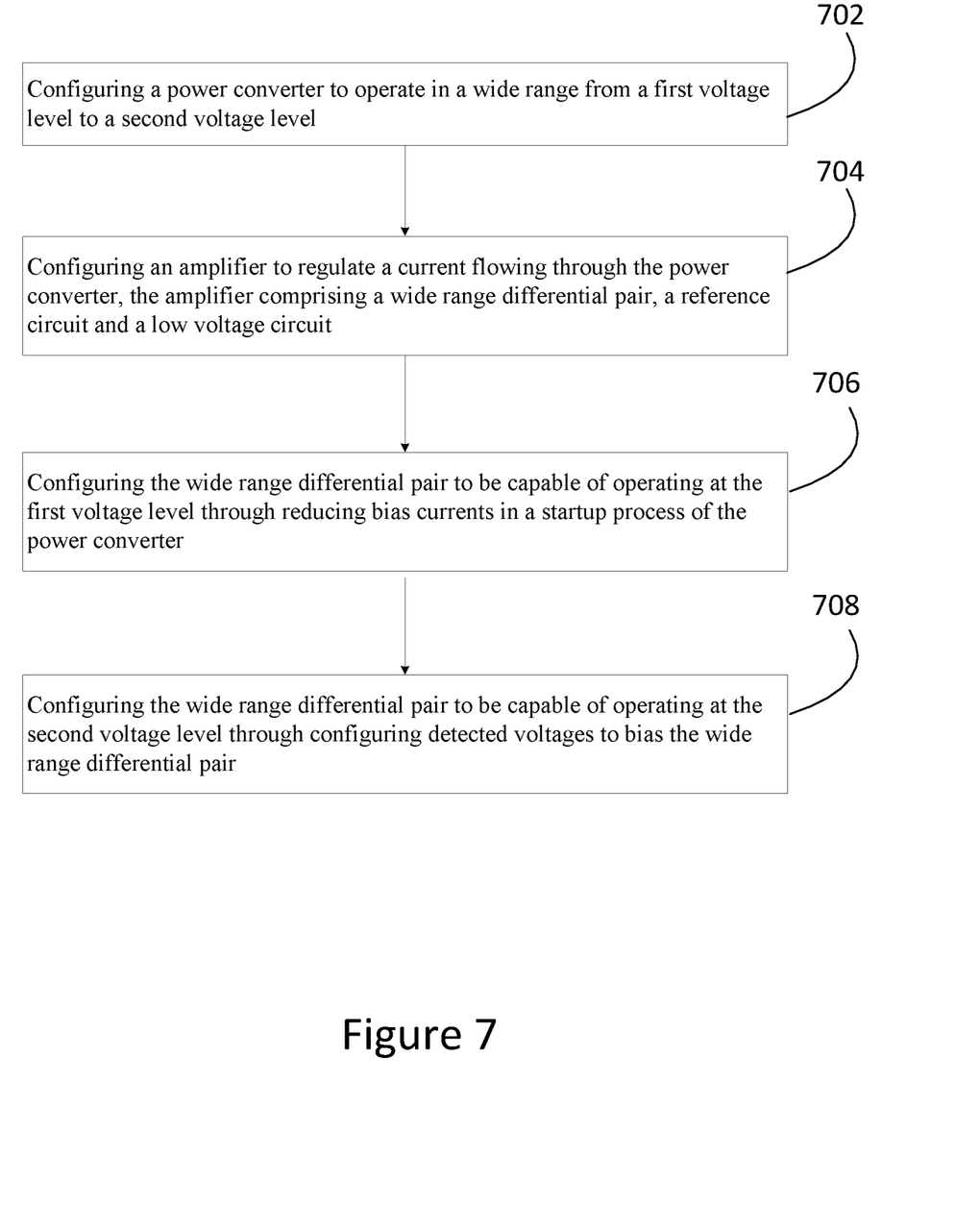
FIG. 7 illustrates a flow chart of controlling and operating the error amplifier shown in FIG. 1 in accordance with various embodiments of the present disclosure.

FIG. 7 illustrates a flow chart of controlling and operating the error amplifier shown in FIG. 1 in accordance with various embodiments of the present disclosure. This flowchart shown in FIG. 7 is merely an example, which should not unduly limit the scope of the claims. One of ordinary skill in the art would recognize many variations, alternatives, and modifications. For example, various steps illustrated in FIG. 7 may be added, removed, replaced, rearranged and repeated.

Referring back to FIG. 1, an error amplifier is configured to receive detected voltages on the CSP and CSN nodes. The error amplifier is configured to generate a control voltage VCOMP based on the detected voltages and a predetermined reference voltage VREF. The control voltage VCOMP is fed into a PWM controller where gate drive signals are generated to control the on and off of the power switches Q1 and Q2.

Referring back to FIG. 2, the error amplifier comprises a wide range differential pair, a reference circuit, a low voltage circuit and a voltage control loop circuit. The error amplifier can be configured as a current error amplifier or a voltage error amplifier.

At step 702, a power converter is configured to operate in a wide range from a first voltage level to a second voltage level.

At step 704, an amplifier is configured to regulate a current flowing through the power converter, the amplifier comprising a wide range differential pair, a reference circuit and a low voltage circuit.

At step 706, the wide range differential pair is configured to be capable of operating at the first voltage level through reducing bias currents in a startup process of the power converter.

At step 708, the wide range differential pair is configured to be capable of operating at the second voltage level through configuring detected voltages to bias the wide range differential pair.

Referring back to FIG. 3, the wide range differential pair comprises a first transistor and a third transistor connected in series between a first intermediate node and a first input of the low voltage circuit, a second transistor and a fourth transistor connected in series between the first intermediate node and a second input of the low voltage circuit, a fifth transistor and a sixth transistor connected in series between an input voltage of the power converter and the first intermediate node, a first resistor, a third resistor and a first current source connected in series between a first input of the amplifier and ground, and wherein a common node of the first resistor and the third resistor is connected to a gate of the first transistor, and a common node of the third resistor and the first current source is connected to a gate of the third transistor, and a second resistor, a fourth resistor and a second current source connected in series between a second input of the amplifier and ground, and wherein a common node of the second resistor and the fourth resistor is connected to a gate of the second transistor, and a common node of the fourth resistor and the second current source is connected to a gate of the fourth transistor.

Referring back to FIG. 3, the first input of the amplifier is connected to a common node of an inductor and a current sense resistor, and the second input of the amplifier is connected to a common node of the current sense resistor and an output capacitor of the power converter.

Referring back to FIG. 3, the method further comprises configuring the first transistor, the second transistor and the fifth transistor as low voltage devices, configuring the sixth transistor to provide isolation between the input voltage of the power converter and the first input of the amplifier and the second input of the amplifier, and configuring the third transistor and the fourth transistor to provide isolation between the first input of the amplifier and the second input of the amplifier, and the low voltage circuit.

Referring back to FIG. 4, the reference circuit comprises an operation amplifier having a non-inverting input configured to receive a reference voltage, and a fourteenth transistor and a fifth resistor connected in series between the wide range differential pair and ground, and wherein a common node of the fourteenth transistor and the fifth resistor is connected to an inverting input of the operation amplifier, and a gate of the fourteenth transistor is connected to an output of the operation amplifier.

Referring back to FIG. 4, the method further comprises configuring the operation amplifier such that a voltage difference between the first input of the amplifier and the second input of the amplifier is proportional to the reference voltage.

Referring back to FIG. 5, the low voltage circuit comprises a third current source, a twelfth transistor and a tenth transistor connected in series between a bias voltage and ground, a fourth current source, a thirteenth transistor and an eleventh transistor connected in series between the bias voltage and ground, and wherein gates of the tenth transistor and the eleventh transistor are connected together and further connected to a common node of the fourth current source and the thirteenth transistor, and gates of the twelfth transistor and the thirteenth transistor are connected to a predetermined bias voltage, a compensation capacitor connected between a common node of the third current source and the twelfth transistor, and ground, a first auxiliary switch and a third auxiliary switch connected in series between a common node of the twelfth transistor and the tenth transistor, and ground, and wherein a common node of the first auxiliary switch and the third auxiliary switch is a first input of the low voltage circuit, and a second auxiliary switch and a fourth auxiliary switch connected in series between a common node of the thirteenth transistor and the eleventh transistor, and ground, and wherein a common node of the second auxiliary switch and the fourth auxiliary switch is a second input of the low voltage circuit.

Referring back to FIG. 6, the method further comprises turning on the first auxiliary switch and the second auxiliary switch, and turning off the third auxiliary switch and the fourth auxiliary switch to steer differential currents from the wide range differential pair into the low voltage circuit, and through the twelfth transistor, the tenth transistor, the thirteenth transistor and the eleventh transistor, converting the differential currents into a control voltage on the compensation capacitor.

Referring back to FIG. 6, the amplifier further comprises a voltage control loop circuit, and wherein the voltage control loop circuit comprises a ninth transistor connected between the bias voltage and a second intermediate node, a seventh transistor connected between the second intermediate node and the common node of the thirteenth transistor and the eleventh transistor, an eighth transistor connected between the second intermediate node and the common node of the twelfth transistor and the tenth transistor, and a sixth resistor and a seventh resistor connected in series between a second input of the amplifier and ground, and wherein a gate of the eighth transistor is connected to a common node of the sixth resistor and the seventh resistor, and a gate of the seventh transistor is configured to receive a reference voltage.

Referring back to FIG. 6, the method further comprises turning off the first auxiliary switch and the second auxiliary switch, and turning on the third auxiliary switch and the fourth auxiliary switch to switch from a current control mode to a voltage control mode, and configuring the amplifier such that an output voltage of the power converter is proportional to the reference voltage.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
   a wide range differential pair configured to operate at a low voltage level through reducing bias currents in a startup process of a power converter, and operate at a high voltage level through configuring detected voltages to bias the wide range differential pair;
   a reference circuit configured to regulate a current flowing through the power converter through the wide range differential pair; and
   a low voltage circuit configured to convert differential currents generated by the wide range differential pair into a control voltage for regulating the current flowing through the power converter.

2. The apparatus of claim 1, wherein the wide range differential pair comprises:
   a first transistor and a third transistor connected in series between a first intermediate node and a first input of the low voltage circuit;
   a second transistor and a fourth transistor connected in series between the first intermediate node and a second input of the low voltage circuit;
   a fifth transistor and a sixth transistor connected in series between an input voltage of the power converter and the first intermediate node, and wherein a gate of the fifth transistor is connected to a first predetermined bias voltage, and a gate of the sixth transistor is connected to a second predetermined bias voltage;
   a first resistor, a third resistor and a first current source connected in series between a first input of the wide range differential pair and ground, and wherein a common node of the first resistor and the third resistor is connected to a gate of the first transistor, and a common node of the third resistor and the first current source is connected to a gate of the third transistor, and wherein the first input of the wide range differential pair is connected to a first terminal of a current sense device of the power converter; and
   a second resistor, a fourth resistor and a second current source connected in series between a second input of the wide range differential pair and ground, and wherein a common node of the second resistor and the fourth resistor is connected to a gate of the second transistor, and a common node of the fourth resistor and the second current source is connected to a gate of the fourth transistor, and wherein the second input of the wide range differential pair is connected to a second terminal of the current sense device of the power converter.

3. The apparatus of claim 1, wherein the reference circuit comprises:
   an operation amplifier having a non-inverting input configured to receive a reference voltage; and
   a fourteenth transistor and a fifth resistor connected in series between the wide range differential pair and ground, and wherein:
     a common node of the fourteenth transistor and the fifth resistor is connected to an inverting input of the operation amplifier; and
     a gate of the fourteenth transistor is connected to an output of the operation amplifier.

4. The apparatus of claim 1, wherein the low voltage circuit comprises:
   a third current source, a twelfth transistor and a tenth transistor connected in series between a bias voltage and ground;
   a fourth current source, a thirteenth transistor and an eleventh transistor connected in series between the bias voltage and ground, and wherein gates of the tenth transistor and the eleventh transistor are connected together and further connected to a common node of the fourth current source and the thirteenth transistor, and gates of the twelfth transistor and the thirteenth transistor are connected to a predetermined bias voltage;
   a compensation capacitor connected between a common node of the third current source and the twelfth transistor, and ground;
   a first auxiliary switch and a third auxiliary switch connected in series between a common node of the twelfth transistor and the tenth transistor, and ground, and wherein a common node of the first auxiliary switch and the third auxiliary switch is a first input of the low voltage circuit; and
   a second auxiliary switch and a fourth auxiliary switch connected in series between a common node of the thirteenth transistor and the eleventh transistor, and ground, and wherein a common node of the second auxiliary switch and the fourth auxiliary switch is a second input of the low voltage circuit.

5. The apparatus of claim 4, further comprising:
   a voltage control loop circuit for regulating an output voltage of the power converter.

6. The apparatus of claim 5, wherein the voltage control loop circuit comprises:
a ninth transistor connected between the bias voltage and a second intermediate node;
a seventh transistor connected between the second intermediate node and the common node of the thirteenth transistor and the eleventh transistor; an eighth transistor connected between the second intermediate node and the common node of the twelfth transistor and the tenth transistor; and a sixth resistor and a seventh resistor connected in series between an output of the power converter and ground, and wherein:
a gate of the eighth transistor is connected to a common node of the sixth resistor and the seventh resistor; a gate of the seventh transistor is configured to receive a reference voltage; and a gate of the ninth transistor is connected to a third predetermined bias voltage.

7. The apparatus of claim 6, wherein:
the first auxiliary switch and the second auxiliary switch are turned off;
the third auxiliary switch and the fourth auxiliary switch are turned on; and
the voltage control loop circuit is configured such that an output voltage of the power converter is proportional to the reference voltage.

8. A method comprising:
configuring a power converter to operate in a wide range from a first voltage level to a second voltage level;
configuring an amplifier to regulate a current flowing through the power converter, the amplifier comprising a wide range differential pair, a reference circuit and a low voltage circuit;
configuring the wide range differential pair to be capable of operating at the first voltage level through reducing bias currents in a startup process of the power converter; and
configuring the wide range differential pair to be capable of operating at the second voltage level through configuring detected voltages to bias the wide range differential pair.

9. The method of claim 8, wherein the wide range differential pair comprises:
a first transistor and a third transistor connected in series between a first intermediate node and a first input of the low voltage circuit;
a second transistor and a fourth transistor connected in series between the first intermediate node and a second input of the low voltage circuit;
a fifth transistor and a sixth transistor connected in series between an input voltage of the power converter and the first intermediate node;
a first resistor, a third resistor and a first current source connected in series between a first input of the amplifier and ground, and wherein a common node of the first resistor and the third resistor is connected to a gate of the first transistor, and a common node of the third resistor and the first current source is connected to a gate of the third transistor; and
a second resistor, a fourth resistor and a second current source connected in series between a second input of the amplifier and ground, and wherein a common node of the second resistor and the fourth resistor is connected to a gate of the second transistor, and a common node of the fourth resistor and the second current source is connected to a gate of the fourth transistor.

10. The method of claim 9, wherein:
the first input of the amplifier is connected to a common node of an inductor and a current sense resistor; and
the second input of the amplifier is connected to a common node of the current sense resistor and an output capacitor of the power converter.

11. The method of claim 9, further comprising:
configuring the first transistor, the second transistor and the fifth transistor as low voltage devices;
configuring the sixth transistor to provide isolation between the input voltage of the power converter and the first input of the amplifier and the second input of the amplifier; and
configuring the third transistor and the fourth transistor to provide isolation between the first input of the amplifier and the second input of the amplifier, and the low voltage circuit.

12. The method of claim 8, wherein the reference circuit comprises:
an operation amplifier having a non-inverting input configured to receive a reference voltage; and
a fourteenth transistor and a fifth resistor connected in series between the wide range differential pair and ground, and wherein:
a common node of the fourteenth transistor and the fifth resistor is connected to an inverting input of the operation amplifier; and
a gate of the fourteenth transistor is connected to an output of the operation amplifier.

13. The method of claim 12, further comprising:
configuring the operation amplifier such that a voltage difference between the first input of the amplifier and the second input of the amplifier is proportional to the reference voltage.

14. The method of claim 8, wherein the low voltage circuit comprises:
a third current source, a twelfth transistor and a tenth transistor connected in series between a bias voltage and ground;
a fourth current source, a thirteenth transistor and an eleventh transistor connected in series between the bias voltage and ground, and wherein gates of the tenth transistor and the eleventh transistor are connected together and further connected to a common node of the fourth current source and the thirteenth transistor, and gates of the twelfth transistor and the thirteenth transistor are connected to a predetermined bias voltage;
a compensation capacitor connected between a common node of the third current source and the twelfth transistor, and ground;
a first auxiliary switch and a third auxiliary switch connected in series between a common node of the twelfth transistor and the tenth transistor, and ground, and wherein a common node of the first auxiliary switch and the third auxiliary switch is a first input of the low voltage circuit; and
a second auxiliary switch and a fourth auxiliary switch connected in series between a common node of the thirteenth transistor and the eleventh transistor, and ground, and wherein a common node of the second auxiliary switch and the fourth auxiliary switch is a second input of the low voltage circuit.

15. The method of claim 14, further comprising:
turning on the first auxiliary switch and the second auxiliary switch, and turning off the third auxiliary switch and the fourth auxiliary switch to steer differential currents from the wide range differential pair into the low voltage circuit; and
through the twelfth transistor, the tenth transistor, the thirteenth transistor and the eleventh transistor, converting the differential currents into a control voltage on the compensation capacitor.

16. The method of claim 14, wherein the amplifier further comprises a voltage control loop circuit, and wherein the voltage control loop circuit comprises:
a ninth transistor connected between the bias voltage and a second intermediate node;

a seventh transistor connected between the second intermediate node and the common node of the thirteenth transistor and the eleventh transistor;
an eighth transistor connected between the second intermediate node and the common node of the twelfth transistor and the tenth transistor; and
a sixth resistor and a seventh resistor connected in series between a second input of the amplifier and ground, and wherein:
  a gate of the eighth transistor is connected to a common node of the sixth resistor and the seventh resistor; and
  a gate of the seventh transistor is configured to receive a reference voltage.

17. The method of claim 16, further comprising:
turning off the first auxiliary switch and the second auxiliary switch, and turning on the third auxiliary switch and the fourth auxiliary switch to switch from a current control mode to a voltage control mode; and
configuring the amplifier such that an output voltage of the power converter is proportional to the reference voltage.

18. A power converter comprising:
a first power switch and a second power switch connected in series between an input voltage bus and ground;
an inductor connected between a common node of the first power switch and the second power switch and a first terminal of a current sense device;
a capacitor connected between a second terminal of the current sense device and ground; and
a wide range amplifier having a first input connected to the first terminal of the current sense device, a second input connected to the second terminal of the current sense device and a third input configured to receive a reference voltage, wherein the wide range amplifier is configured to operate at a low voltage level through reducing bias currents in a startup process of the power converter, and operate at a high voltage level through configuring voltages on the first terminal and the second terminal of the current sense device to bias the wide range amplifier.

19. The power converter of claim 18, wherein:
the current sense device is a current sense resistor.

20. The power converter of claim 18, wherein the wide range amplifier comprising a wide range differential pair, a reference circuit, a low voltage circuit and a voltage control loop circuit, and wherein:
  the wide range differential pair comprises:
    a first transistor and a third transistor connected in series between a first intermediate node and a first input of the low voltage circuit;
    a second transistor and a fourth transistor connected in series between the first intermediate node and a second input of the low voltage circuit;
    a fifth transistor and a sixth transistor connected in series between an input voltage of the power converter and the first intermediate node;
    a first resistor, a third resistor and a first current source connected in series between the first terminal of the current sense device and ground, and wherein a common node of the first resistor and the third resistor is connected to a gate of the first transistor, and a common node of the third resistor and the first current source is connected to a gate of the third transistor; and
    a second resistor, a fourth resistor and a second current source connected in series between the second terminal of the current sense device and ground, and wherein a common node of the second resistor and the fourth resistor is connected to a gate of the second transistor, and a common node of the fourth resistor and the second current source is connected to a gate of the fourth transistor;
  the reference circuit comprises:
    an operation amplifier having a non-inverting input configured to receive a reference voltage; and
    a fourteenth transistor and a fifth resistor connected in series between the common node of the first resistor and the third resistor, and ground, and wherein:
      a common node of the fourteenth transistor and the fifth resistor is connected to an inverting input of the operation amplifier; and
      a gate of the fourteenth transistor is connected to an output of the operation amplifier;
  the low voltage circuit comprises:
    a third current source, a twelfth transistor and a tenth transistor connected in series between a bias voltage and ground;
    a fourth current source, a thirteenth transistor and an eleventh transistor connected in series between the bias voltage and ground, and wherein gates of the tenth transistor and the eleventh transistor are connected together and further connected to a common node of the fourth current source and the thirteenth transistor, and gates of the twelfth transistor and the thirteenth transistor are connected to a predetermined bias voltage;
    a compensation capacitor connected between a common node of the third current source and the twelfth transistor, and ground;
    a first auxiliary switch and a third auxiliary switch connected in series between a common node of the twelfth transistor and the tenth transistor, and ground, and wherein a common node of the first auxiliary switch and the third auxiliary switch is the first input of the low voltage circuit; and
    a second auxiliary switch and a fourth auxiliary switch connected in series between a common node of the thirteenth transistor and the eleventh transistor, and ground, and wherein a common node of the second auxiliary switch and the fourth auxiliary switch is the second input of the low voltage circuit; and
  the voltage control loop circuit comprises:
    a ninth transistor connected between the bias voltage and a second intermediate node;
    a seventh transistor connected between the second intermediate node and the common node of the thirteenth transistor and the eleventh transistor;
    an eighth transistor connected between the second intermediate node and the common node of the twelfth transistor and the tenth transistor, and
    a sixth resistor and a seventh resistor connected in series between the second terminal of the current sense device and ground, and wherein:
      a gate of the eighth transistor is connected to a common node of the sixth resistor and the seventh resistor, and
      a gate of the seventh transistor is configured to receive the reference voltage.

* * * * *